US008744670B2

(12) United States Patent
Zhu et al.

(10) Patent No.: US 8,744,670 B2
(45) Date of Patent: Jun. 3, 2014

(54) METHOD AND SYSTEM FOR QUICKLY CALCULATING MILEAGE

(75) Inventors: Jie Zhu, Guangdong (CN); Jialiang Chu, Guangdong (CN); Decheng Huang, Guangdong (CN); Youwen Zhang, Guangdong (CN)

(73) Assignee: ChinaGps Co., Ltd (Shenzhen), Shenzhen, Guangdong (CN)

( * ) Notice: Subject to any disclaimer, the term of this patent is extended or adjusted under 35 U.S.C. 154(b) by 152 days.

(21) Appl. No.: 13/511,602

(22) PCT Filed: Sep. 8, 2010

(86) PCT No.: PCT/CN2010/076730
§ 371 (c)(1),
(2), (4) Date: May 23, 2012

(87) PCT Pub. No.: WO2011/063677
PCT Pub. Date: Jun. 3, 2011

(65) Prior Publication Data
US 2012/0253589 A1 Oct. 4, 2012

(30) Foreign Application Priority Data
Nov. 24, 2009 (CN) .......................... 2009 1 0109853

(51) Int. Cl.
*G01C 21/00* (2006.01)
*G01C 21/10* (2006.01)
*G01C 21/34* (2006.01)
(52) U.S. Cl.
CPC .................................. *G01C 21/3469* (2013.01)
USPC ............... 701/33.4; 701/7; 701/33.3; 701/79; 701/93; 701/96; 701/102; 701/110; 701/119; 701/121; 701/430; 701/492; 701/527; 701/540

(58) Field of Classification Search
CPC ......................... G01C 21/3469; G01C 21/3697
USPC ......... 701/7, 33.3, 33.4, 79, 93, 96, 102, 110, 701/119, 121, 430, 492, 527, 540
See application file for complete search history.

(56) References Cited

U.S. PATENT DOCUMENTS 6,115,655 A * 9/2000 Keith et al. .................... 701/467
6,167,346 A * 12/2000 Fukawa ........................ 701/410
(Continued)

FOREIGN PATENT DOCUMENTS

CN 101033982 A 9/2007
CN 101149273 A 3/2008
(Continued)

*Primary Examiner* — Mary Cheung
*Assistant Examiner* — Atul Trivedi
(74) *Attorney, Agent, or Firm* — Morris Manning & Martin LLP; Tim Tingkang Xia, Esq.

(57) ABSTRACT

A method for quickly calculating mileage includes the steps: A, receiving report data from a vehicular terminal and updating data center according to the report data; B, receiving an inquiry request which includes a vehicle number, a first time point which is earlier than a second time point and the second time point which are requested to inquire; C, inquiring the data center to acquire a first total mileage value to which the time point that is proximate to the first time point corresponds and a second total mileage value to which the time point that is proximate to the second time point corresponds; D, obtaining a running mileage L from the first time point to the second time point by subtracting the first total mileage value from the second total mileage value. A system for quickly calculating mileage quickly is also proposed. The method and the system can calculate mileage quickly and accurately, reduce the processing burden of the data center, and facilitate the vehicle surveillance of the traffic department.

5 Claims, 2 Drawing Sheets

(56) References Cited

U.S. PATENT DOCUMENTS

| | | | |
|---|---|---|---|
| 6,609,051 B2 * | 8/2003 | Fiechter et al. | 701/29.3 |
| 6,609,951 B1 * | 8/2003 | Bates et al. | 451/6 |
| 6,671,680 B1 * | 12/2003 | Iwamoto et al. | 707/737 |
| 6,741,933 B1 * | 5/2004 | Glass | 701/454 |
| 7,555,370 B2 * | 6/2009 | Breed et al. | 701/2 |
| 7,668,653 B2 * | 2/2010 | Habaguchi | 701/438 |
| 8,073,616 B2 * | 12/2011 | Yamada | 701/540 |
| 8,311,858 B2 * | 11/2012 | Everett et al. | 705/4 |
| 2003/0055599 A1 | 3/2003 | Ohle et al. | |
| 2007/0168217 A1 * | 7/2007 | Weas et al. | 705/1 |
| 2008/0162193 A1 | 7/2008 | Voggenauer | |
| 2010/0198629 A1 * | 8/2010 | Weisleder et al. | 705/7 |
| 2011/0172871 A1 * | 7/2011 | Hall et al. | 701/29 |
| 2012/0089423 A1 * | 4/2012 | Tamir et al. | 705/4 |
| 2012/0253589 A1 * | 10/2012 | Zhu et al. | 701/33.4 |

FOREIGN PATENT DOCUMENTS

| | | |
|---|---|---|
| CN | 101470012 A | 7/2009 |
| JP | 2003322545 A | 11/2003 |

* cited by examiner

METHOD AND SYSTEM FOR QUICKLY CALCULATING MILEAGE

FIELD OF THE INVENTION

The present invention relates to a method and system for calculating mileage, and in particular to a method and system for quickly calculating mileage.

BACKGROUND OF THE UTILITY MODEL

In the past, vehicle mileage data in a certain period of time can only be obtained by reading a vehicle odometer. However, many vehicle odometers are broken and thus cannot indicate the mileage data accurately. Moreover, the mileage data can be adjusted manually even for some high-end cars. As such, it is hard for management units of such vehicles to obtain accurate running mileage of these vehicles, thus making it possible for a vehicle user to abuse his/her vehicle.

Based on the reasons above, a method for acquiring total running mileage of vehicles is provided, which reports current GPS mileage value to a data center by usage of GPS and then accumulates the mileage data in the data center to get the total running mileage. Nevertheless, this method has the following drawbacks. On one hand, software of the data center may crash, in which case the reported mileage may not be stored into a hard disk in the data center, which results in that the accumulated total mileage data is a little smaller; on the other hand, there is too much or even mass of reported mileage, thereby causing difficulty in processing to software of the data center.

Accordingly, it is needed to find out a new kind of method for calculating mileage so as to solve the problems above.

SUMMARY OF THE UTILITY MODEL

One objective of the present invention is to provide a method for quickly calculating mileage aiming at the drawbacks that the calculation of mileage data is complicated and inaccurate as well as the processing of mass data is difficult in the prior art.

Another objective of the present invention is to provide a system for quickly calculating mileage to solve the above-mentioned problems in the prior art in a better way.

According to an aspect, a method for quickly calculating mileage is provided, wherein a vehicular terminal reports data to a data center in a timing mode; the data includes a vehicle number, a report time and a total mileage value, and the total mileage value is a current total mileage value of a vehicle corresponding to the vehicle number during the report time. The method includes the following steps:

A. receiving report data from the vehicular terminal and updating the data center according to the report data; wherein the report data includes the vehicle number, the report time and the total mileage value, and the total mileage value is a total mileage value of the vehicle corresponding to the vehicle number during the report time;

B. receiving an inquiry request which includes the vehicle number, a first time point and a second time point which are requested to inquire, wherein the first time point is earlier than the second time point;

C. inquiring the data center to acquire a first total mileage value and a second total mileage value for the vehicle number which is requested to inquire, wherein the time point to which the first total mileage value corresponds is larger than or equal to and further proximate to the first time point, and the time point to which the second total mileage value corresponds is smaller than or equal to and further proximate to the second time point;

D. obtaining a running mileage L for the vehicle number requested to inquire from the first time point to the second time point by subtracting the first total mileage value from the second total mileage value.

In the method for quickly calculating mileage provided in the present invention, the step C comprises:

C1. screening out the data having a report time within a range from the first time point to the second time point from the data center;

C2. screening out the first total mileage value proximate to the first time point and the second total mileage value proximate to the second time point for the vehicle number which is requested to inquire from the date acquired in the step C1.

In the method for quickly calculating mileage provided in the present invention, the step C2 comprises:

C21. sorting the data obtained in the step C1 in a descending order in accordance with the report time and extracting the data in the first place of a sorted result for respective vehicle number which is requested to inquire;

C22. sorting the data obtained in the step C1 in an ascending order in accordance with the report time and extracting the data in the first place of a sorted result for respective vehicle number which is requested to inquire.

In the method for quickly calculating mileage provided in the present invention, the step C comprises:

C1. screening out the data corresponding to the vehicle number which is requested to inquire from the data center;

C2. screening out data having a report time within a range from the first time point to the second time point from the data acquired in the step C1, and further screening out the first total mileage value proximate to the first time point and the second total mileage value proximate to the second time point from the data obtained therefrom.

In the method for quickly calculating mileage provided in the present invention, the method further comprises the following step:

E. returning the running mileage L to a user which requests to inquire.

According to another aspect, a system for quickly calculating mileage is further provided which includes an inquiry request receiving unit, a data extraction unit, a mileage calculation unit and a data center.

The inquiry request receiving unit is used for receiving an inquiry request which includes a vehicle number, a first time point and a second time point which are requested to inquire, wherein the first time point is earlier than the second time point.

The data extraction unit is used for inquiring the data center to acquire a first total mileage value and a second total mileage value for the vehicle number which is requested to inquire, wherein the time point to which the first total mileage value corresponds is larger than or equal to and further proximate to the first time point, and the time point to which the second total mileage value corresponds is smaller than or equal to and further proximate to the second time point.

The mileage calculation unit is used for obtaining a running mileage L for the vehicle number requested to inquire from the first time point to the second time point by subtracting the first total mileage value from the second total mileage value.

The data center is used for receiving report data from a vehicular terminal and updating itself according to the report data; wherein the report data includes the vehicle number, the report time and the total mileage value, and the total mileage value is a total mileage value of the vehicle corresponding to the vehicle number during the report time.

In the system for quickly calculating mileage provided in the present invention, the system further comprises a data output unit connected with the mileage calculation unit for returning the running mileage L to a user.

In the system for quickly calculating mileage provided in the present invention, the vehicular terminal reports in a timing mode.

In the system for quickly calculating mileage provided in the present invention, the data output unit returns the running mileage L to the user in the mode of browser/server or client/server.

When implementing the technical solution of the present invention, the following advantageous effect can be achieved. When the vehicular terminal reports the current total mileage value of a vehicle to the data center, the latter acquires the reported total mileage value from the vehicular terminal and further implements an updating and an accumulation when the same vehicle reports its total mileage value again. When the user needs to inquire, a desired result can be calculated quickly and accurately and further provided to the user utilizing the method and system for quickly calculating mileage of the present invention. In this case, the accuracy of calculation results is ensured, the burden of data processing for the data center is reduced, standardized management of a traffic administrate department on vehicles is convenient, and the possibility of abusing vehicles is eliminated.

BRIEF DESCRIPTION OF THE DRAWINGS

The present invention will be further described with reference to the accompanying drawings and embodiments in the following. In the figures.

DETAILED DESCRIPTION OF THE PREFERRED EMBODIMENT

In order to make the objective, technical solution and advantages of the present invention more clear, the present invention will be further explained in detail with reference to the accompanying drawings and embodiments in the following. It is understood that the specific embodiments described here are only for illustration instead of limitation of the present invention.

Figure 1:
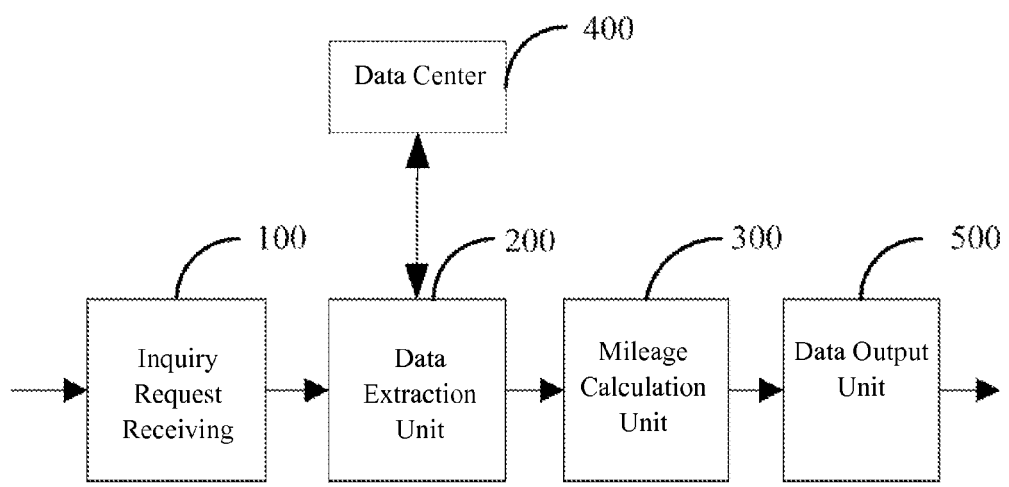
FIG. 1 is a logic block diagram for the system for quickly calculating mileage in a preferred embodiment of the present invention.

FIG. 1 is a logic block diagram for the system for quickly calculating mileage in a preferred embodiment of the present invention. The system for quickly calculating mileage comprises an inquiry request receiving unit 100, a data extraction unit 200, a mileage calculation unit 300, a data output unit 500 and a data center 400 connected in sequence.

The data center 400 stores data reported by a vehicular terminal in a timing mode (e.g. reporting once in a minute). The report data includes a vehicle number, a report time and a total mileage value. Wherein, the reported total mileage value is a current total mileage value rather than the mileage during only one running process. In addition, the respective report time for each vehicle number corresponds to one total mileage vale. When a user needs to inquire the total mileage data during any time interval, the data center can retrieve the data to perform data processing in time and further provide feedback to the user.

The inquiry request receiving unit 100 receives an inquiry request which includes the vehicle number, a starting time (i.e. a first time point) and an end time (i.e. a second time point) which are requested to inquire.

The data extraction unit 200 extracts a total mileage value L1 proximate to the starting time and a total mileage value L2 proximate to the end time from the data center 400 for the vehicle corresponding to the vehicle number which is requested to inquire.

The processing procedure of the data extraction unit 200 can be carried out as follows. The data D1 having the report time within a range from the starting time to the end time is screened out from the data center 400, and then the total mileage value L1 proximate to the starting time and the total mileage value L2 proximate to the end time are screened out from the date D1 for the vehicle number which is requested to inquire. Herein, a descending and ascending sorting can be used to screen out the total mileage value L1 proximate to the starting time and the total mileage value L2 proximate to the end time, respectively. For example:

1. The data D1 is sorted in a descending order in accordance with the report time; then the first data (i.e. the total mileage value L2 proximate to the end time) in a sorted result is extracted for the respective vehicle number which is requested to inquire.

2. The data D1 is sorted in an ascending order in accordance with the report time; the first data (i.e. the total mileage value L1 proximate to the starting time) in a sorted result is extracted for the respective vehicle number which is requested to inquire.

The mileage calculation unit 300 subtracts the total mileage value L1 proximate to the starting time from the total mileage value L2 proximate to the end time in accordance with the vehicle number which is requested to inquire. The difference obtained therefrom is the running mileage L from the starting time to the end time for the vehicle number which is requested to inquire.

The processing procedure of the data extraction unit 200 can also be carried out as follows. The data corresponding to the vehicle number which is requested to inquire is firstly screened out from the data center 400. After that, data having a report time within a range from the first time point to the second time point is screened out from such data, and the obtained data therefrom is further screened to acquire the total mileage value proximate to the first time point and the total mileage value proximate to the second time point.

The data output unit 500 returns the running mileage L to the user in the mode of browser/server (B/S) or client/server (C/S).

Figure 2:
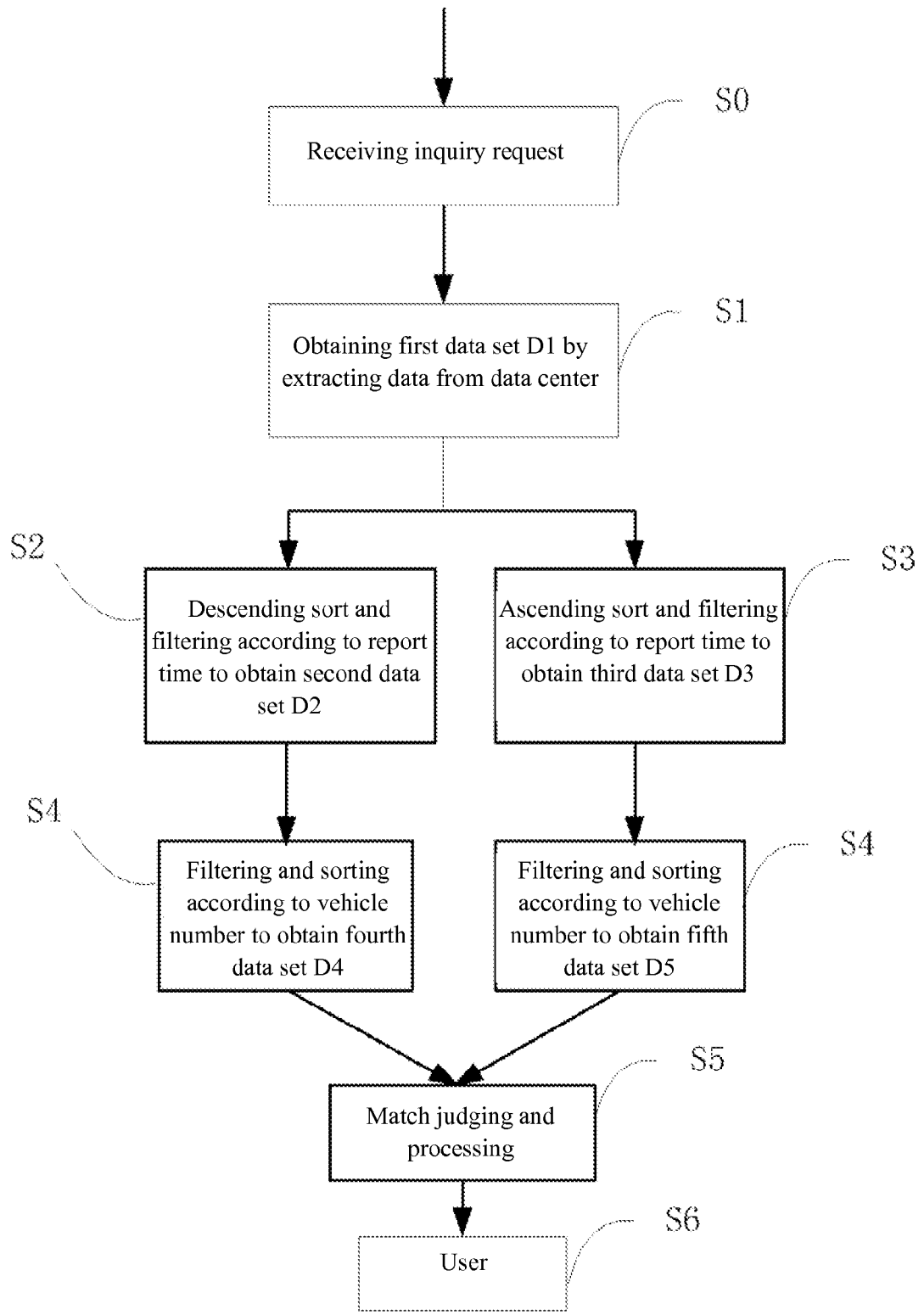
FIG. 2 is a flow diagram for the method for quickly calculating mileage in a preferred embodiment of the present invention.

FIG. 2 is a flow diagram for the method for quickly calculating mileage in a preferred embodiment of the present invention. In this embodiment, the employed data report mode, data report content, method for calculating mileage data and method for outputting processing results are described as follows.

1) The report mode: a vehicular terminal reports data in a timing mode (while the report mode can be modified as required; for example, report in real time); for instance, it reports a total mileage once in a minute.

2) The report content: the respective report content stands for a current total mileage for a vehicle rather than its mileage during only one running process.

3) The method for calculating mileage data: this will be described in detail in the following.

4) The method for outputting processing results: the running mileage processed by the method for calculating mileage data is presented to the user requesting to inquire in the mode of BS or CS.

The method for calculating mileage date in the embodiment of the present invention will be further explained below.

The data center 400 stores the data reported by the vehicular terminal; wherein such data includes a vehicle number, a report time and a total mileage value, and the respective report time of each vehicle number corresponds to one total mileage vale.

S0. An inquiry request is received, which includes the vehicle number, a starting time and an end time that are requested to inquire.

S1. The data (a first data set D1) from the starting time to the end time when requesting to inquire is screened out in the data center according to a user's requirement, wherein the data includes the vehicle number, the report time and the total mileage value and so on.

S2. The data acquired in step S1 (the first data set D1) is sorted in a descending order in accordance with the report time, and then the first data for each vehicle (a second data set D2), i.e. the data proximate to the end time of the inquiry, is extracted. This data includes the total mileage information, of which the specific information comprises the vehicle number, the report time and the total mileage value etc.

S3. The data acquired in step S1 is sorted in an ascending order in accordance with the report time, and then the first data for each vehicle (a third data set D3), i.e. the data proximate to the starting time of the inquiry, is extracted. This data includes the total mileage information, of which the specific information comprises the vehicle number, the report time and the total mileage value etc.

S4. The data acquired in step S2 is screened and filtered so as to select the data for the vehicle to be inquired. The selected data is further sorted according to the vehicle number (a fourth data set D4).

The data acquired in step S3 is screened and filtered so as to select the data for the vehicle to be inquired. The selected data is further sorted according to the vehicle number (a fifth data set D5).

S5. The two data sets acquired in step S4 (the fourth data set D4 and the fifth data set D5) are matched in accordance with the vehicle number. If the vehicle numbers in these two data sets can be matched with respect to each other, the total mileage value of a matched vehicle number in the fifth data set D5 will be subtracted from the total mileage value of a corresponding vehicle number in the fourth data set D4. The obtained difference is the running mileage L of the vehicle during a time interval T. In this way, for each vehicle to be inquired, its running mileage L from the starting time to the end time can be obtained.

S6. The running mileage L is returned to the user requesting to inquire. The user herein can be the vehicle user or the vehicle administrative department.

In the method for calculating mileage data in the embodiment of the present invention, the data which corresponds to the vehicle number that is requested to inquire can also be screened out from the data center 400. After that, such data is sorted to extract the total mileage values for each vehicle number that is requested to inquire; wherein the total mileage values are proximate to the starting time and the end time respectively. At last, a subtraction operation is performed to obtain the running mileage L from the starting time to the end time.

As mentioned in the embodiment of the present invention, the method of screening the total mileage value proximate to the starting time and the end time is only one illustrative example. Any method that can achieve this purpose is within the scope of protection of the present invention.

In the technical solution of the present invention, the vehicular terminal is used to report the current total mileage value of a vehicle to the data center, the latter acquires the reported total mileage value from the vehicular terminal and further implements an updating and an accumulation when the same vehicle reports its total mileage value again. When the user needs to inquire, a desired result can be calculated quickly and accurately and further provided to the user utilizing the method and system for quickly calculating mileage of the present invention. In this case, the accuracy of calculation results is ensured, the burden of data processing for the data center is reduced, standardized management of a traffic administrate department on vehicles is convenient, and the possibility of abusing vehicles is eliminated.

The above-mentioned description is only a preferred embodiment of the present invention which is not used as the limitation of the present invention. Any modifications, equivalents and improvements made within the spirit and principle of the present invention should be included in the scope of protection of the present invention.

What we claimed is:

1. A method for quickly calculating mileage, comprising:
   A. receiving report data from a vehicular terminal and updating a data center (400) according to the report data; wherein the report data includes a vehicle number, a report time and a total mileage value of a vehicle corresponding to the vehicle number during the report time;
   B. receiving an inquiry request which includes the vehicle number, a first time point and a second time point which are requested to inquire, wherein the first time point is earlier than the second time point;
   C. screening out a first data set having a report time within a range from the first time point to the second time point from the data center (400), wherein the first data set includes the vehicle number, the report time and the total mileage value;
   D. sorting the first data set obtained in the step C in a descending order in accordance with the report time, and extracting the first data of the sorted first data set in the descending order for respective vehicle number which is requested to inquire to obtain a second data set;
   E. sorting the first data set obtained in the step C in an ascending order in accordance with the report time, and extracting a first data of the sorted first data set in the ascending order for the respective vehicle number which is requested to inquire to obtain a third data set;
   F. screening and filtering the third data set obtained in the step E and selecting a first total mileage value for the vehicle number which is requested to inquire, and screening and filtering the second data set obtained in the step D and selecting a second total mileage value for the vehicle number which is requested to inquire, wherein a time point to which the first total mileage value corresponds is larger than or equal to and further proximate to the first time point, and a time point to which the second total mileage value corresponds is smaller than or equal to and further proximate to the second time point;
   G. obtaining a running mileage L for the vehicle number requested to inquire from the first time point to the second time point by subtracting the first total mileage value from the second total mileage value; and
   H. returning the running mileage L to a user requesting to inquire.

2. A system for quickly calculating mileage, comprising;
an inquiry request receiver (100) used for receiving an inquiry request which includes a vehicle number, a first time point and a second time point which are requested to inquire, wherein the first time point is earlier than the second time point;

a data center (400) used for receiving report data from a vehicular terminal and updating itself according to the report data, wherein the report data includes the vehicle number, a report time and a total mileage value of a vehicle corresponding to the vehicle number during the report time;

a data extraction filter (200) used for screening out a first data set having a report time within a range from the first time point to the second time point from the data center (400), wherein the first data set includes the vehicle number, the report time and the total mileage value; sorting the first data set in a descending order in accordance with the report time and extracting the first data of the sorted first data set in the descending order for respective vehicle number which is requested to inquire to obtain a second data set, sorting the first data set in an ascending order in accordance with the report time and extracting a first data of the sorted first data set in the ascending order for the respective vehicle number which is requested to inquire to obtain a third data set; screening and filtering the third data set and selecting a first total mileage value for the vehicle number which is requested to inquire, and screening and filtering the second data set and selecting a second total mileage value for the vehicle number which is requested to inquire, wherein a time point to which the first total mileage value corresponds is larger than or equal to and further proximate to the first time point, and a time point to which the second total mileage value corresponds is smaller than or equal to and further proximate to the second time point; and a mileage calculator (300) used for obtaining a running mileage L for the vehicle number requested to inquire from the first time point to the second time point by subtracting the first total mileage value from the second total mileage value.

3. The system for quickly calculating mileage of claim 2, further comprising a data output display (500) connected with the mileage calculator (300) and used for returning the running mileage L to a user.

4. The system for quickly calculating mileage of claim 3, wherein the data output display (500) is used for returning the running mileage L to the user in a mode of browser/server or client/server.

5. The system for quickly calculating mileage of claim 2, wherein the vehicular terminal is used for reporting in a timing mode.

* * * * *